(12) United States Patent
Armbruster

(10) Patent No.: US 11,518,074 B2
(45) Date of Patent: Dec. 6, 2022

(54) DEVICE AND METHOD FOR INJECTION MOLDING

(71) Applicant: FOBOHA (GERMANY) GMBH, Haslach (DE)

(72) Inventor: Rainer Armbruster, Wolfach (DE)

(73) Assignee: FOBOHA (GERMAN) GMBH, Haslach (DE)

( * ) Notice: Subject to any disclaimer, the term of this patent is extended or adjusted under 35 U.S.C. 154(b) by 0 days.

(21) Appl. No.: 17/259,034

(22) PCT Filed: Jul. 19, 2019

(86) PCT No.: PCT/EP2019/069572
§ 371 (c)(1),
(2) Date: Jan. 8, 2021

(87) PCT Pub. No.: WO2020/025361
PCT Pub. Date: Feb. 6, 2020

(65) Prior Publication Data
US 2021/0268700 A1 Sep. 2, 2021

(30) Foreign Application Priority Data
Aug. 3, 2018 (CH) .................................. 00950/18

(51) Int. Cl.
*B29C 45/04* (2006.01)
*B29C 45/16* (2006.01)
(Continued)

(52) U.S. Cl.
CPC ........ *B29C 45/045* (2013.01); *B29C 45/1628* (2013.01); *B29C 45/2681* (2013.01);
(Continued)

(58) Field of Classification Search
CPC .............. B29C 45/045; B29C 45/1628; B29C 45/2681; B29C 45/7312; B29C 2045/0458; B29C 2045/2689
See application file for complete search history.

(56) References Cited

U.S. PATENT DOCUMENTS 6,132,201 A * 10/2000 Looije ..................... B29C 45/06
425/589
2012/0328730 A1* 12/2012 Armbruster ......... B29C 45/1628
425/542
2014/0308388 A1* 10/2014 Armbruster ......... B29C 45/1628
425/577

FOREIGN PATENT DOCUMENTS

CH 701 045 A2 11/2010
CN 101043999 A 9/2007
(Continued)

OTHER PUBLICATIONS

EPO (Riswijk, NL), English language version of the International Search Report, Form PCT/ISA/210, for International Application PCT/EP2019/069572, dated Nov. 20, 2019 (3 pages).
(Continued)

*Primary Examiner* — Kelly M Gambetta
*Assistant Examiner* — Virak Nguon
(74) *Attorney, Agent, or Firm* — Pauley Erickson & Swanson

(57) ABSTRACT

An injection molding device (1) includes a center part (3) and a rotating device (2) for rotating the center part (3) in the injection molding device (1). The rotating device (2) includes a base (4) supported with respect to an injection molding machine. A thereto attached column (5) extends in an axial direction (z) above the base (4). A sleeve (6) coaxially surrounds the column (5) and is at least partially arranged in the center part (3). The sleeve (6) rotates with the
(Continued)

center part (3) around the column (5). The column (5) is arranged removable with respect to the center part (3).

21 Claims, 5 Drawing Sheets

(51) Int. Cl.
*B29C 45/26* (2006.01)
*B29C 45/73* (2006.01)

(52) U.S. Cl.
CPC .. *B29C 45/7312* (2013.01); *B29C 2045/0458* (2013.01); *B29C 2045/2689* (2013.01)

(56) References Cited

FOREIGN PATENT DOCUMENTS

| CN | 102791458 A | 11/2012 |
|---|---|---|
| CN | 101909845 A | 12/2012 |
| CN | 102958664 A | 3/2013 |
| CN | 103153584 A | 6/2013 |
| CN | 103522483 A | 1/2014 |
| CN | 103732376 A | 4/2014 |
| DE | 2 312 955 A1 | 9/1973 |
| DE | 10 2013 004 408 A1 | 9/2014 |
| EP | 1 655 122 A1 | 5/2006 |
| ES | 2 218 319 T3 | 11/2004 |
| JP | S62-80012 A | 4/1987 |
| TW | 436869 B | 5/2001 |
| WO | WO 2013/001022 A1 | 1/2013 |
| WO | WO 2015/158702 A1 | 10/2015 |
| WO | WO 2018/133622 A1 | 7/2018 |

OTHER PUBLICATIONS

Chinese Patent Office (CNIPO), Beijing, P.R. China, First Office Action for Chinese Application No. 201980045327.1, dated Jan. 24, 2022 (4 pages).

Chinese Patent Office (CNIPO), Beijing, P.R. China, Search Report for Chinese Application No. 201980045327.1, dated Jan. 13, 2022 (3 pages).

* cited by examiner

DEVICE AND METHOD FOR INJECTION MOLDING

BACKGROUND OF THE INVENTION

Field of the Invention

The present invention lies in the field of devices and methods for injection molding, namely of plastic products.

Discussion of Related Art

From the prior art devices for injection molding of plastic products are known which comprise a first outer mold half and a thereto along tie bars of an injection molding machine in a first direction relative to the first outer mold half displaceable second outer mold half. Between the first and the second outer mold half a center part is arranged rotatable around a center axis extending in vertical direction. The center part comprises at least two but more often four side faces which are arranged in pairs parallel to each other and which each carry an inner mold half. The inner mold halves in a closed position of the injection molding device interact with the first and the second outer mold halves in a first and in a second separation plane forming cavities suitable to receive melted plastic material injected through a sprue channel into the cavities to form objects consisting at least partially from the melted plastic material. After the melted plastic material has sufficiently cured, the injection molding device is opened in the area of the first and second separation planes and the center part is rotated by an appropriate angle, normally at least 90°, around the center axis such that another two inner mold halves can be interconnected to the first and the second outer mold half forming cavities there between as described above.

The center part and the thereto attached inner mold halves must be supplied with various process media such as cooling water, hydraulic oil, pneumatic air or a selection thereof. The transfer of said process media requires special devices which are nowadays normally arranged outside of the center part. In addition, such devices need frequent maintenance during operation. This can only be achieved by time consuming disassembly of the devices which is a drawback as down time has a negative impact on the operation cost of the device.

On behalf of the same applicant WO2013001022 was published in January 2013. It describes a rotation device for an injection molding device and an injection molding device comprising such a rotation device. The rotation device is for rotating a center part in an injection molding device. The rotation device comprises a column around which a sleeve is arranged rotating with the center part. Process media is transferred between the column and the sleeve.

SUMMARY OF THE INVENTION

An injection molding device according to the invention normally comprises a rotating device, an injection mold and an injection molding machine. The injection mold comprises a first outer mold half and a thereto along tie bars of the injection molding machine in a first direction relative to the first outer mold half displaceable second outer mold half. Between the first and the second outer mold half a center part is arranged rotatable around a center axis extending in vertical direction. The center part can comprise at least two, but more often four or even six side faces, etc., which are arranged in pairs parallel to each other and which carry inner mold halves of the injection mold. The rotating device is for holding and rotating the center part of the injection mold in the injection molding device. The inner mold halves in a closed position of the injection molding device interact with the first and the second outer mold halves in a first and in a second separation plane forming cavities there between suitable to receive melted plastic material injected through a sprue channel into the cavities to form objects consisting at least partially from the melted plastic material. After the melted plastic material has sufficiently cured, the injection molding device is opened in the area of the first and second separation planes and the center part is rotated by the rotating device by an appropriate angle which depends on the number of side faces of the center part around the center axis such that another two inner mold halves can be interconnected to the first and the second outer mold half forming cavities there between as described above.

In difference to the prior art, the rotating device according to the invention offers the advantage that it can be very easily and efficiently assembled and disassembled, e.g. for maintenance reasons. The maintenance time can thereby be significantly reduced, up to 60% and more, compared to the prior art. The invention offers the advantage that, depending on the field of application, the heavy and bulky injection molds do not need to be removed from the injection molding machine to which it is installed.

In the devices known from the prior art the maintenance time is a critical aspect as they require a complete disassembly which usually is very time consuming. Especially the transfer areas for the process media in the rotating device are critical, as the required seals must frequently be checked and if necessary replaced. For obtaining access to the critical areas the injection molding device must be stopped, cooled down and then dismantled to gain access to the critical areas. One significant disadvantage is that the heavy and bulky injection molds consisting of the first and second outer mold halves, as well as the center mold part must be at least partially removed from the injection molding machine in which they are installed.

An injection molding device according to the invention comprises a center part and a rotating device for holding and rotating the center part in the injection molding device. The rotating device comprises a base supported with respect to an injection molding machine, e.g. a machine bed and/or lower tie bars of the injection molding machine. Furthermore, the injection molding device comprises a column attached to the base and extending in an axial direction above the base. A sleeve is arranged on and coaxially surrounds the column. For performance reason and easier handling, the sleeve is at least partially arranged in the center part which is preferably made from a material which has a lower density then the material of the sleeve. Good results can be achieved when the sleeve is made from steel or the like and the center part is made from aluminum or the like. The sleeve rotates with the center part around the column. Grooves arranged between the sleeve and the column are used to exchange liquid and/or gaseous media between the column and the sleeve, respectively the center part.

The column is arranged removable with respect to the center part. In a preferred variation the column is interconnected detachable to the base as will be described in more detail hereinafter. Good results can be achieved when the column along its axial direction has a variable diameter. Depending on the design the variable diameter can be e.g. linearly varying. Alternatively, or in addition the column can have a staggered design, with at least two sections arranged coaxially and adjacent to each other with respect to the axial direction of the column. In a preferred variation the sections are having decreasing diameters in the direction of the base of the rotation device such that the column can be removed from the center part, respectively the sleeve in an upward direction away from the base. The column is therefore interconnected detachably to the base as will be described in more details hereinafter. In principle it would also be possible to arrange the decreasing diameter in the opposite direction, i.e. reduction of diameters away from the base. Thereby it would be possible to leave the column attached to the base and remove the center part in an upward direction away from the base. Alternatively, or in addition a separation of the center part with respect to the rotating device can be achieved by designing the sleeve removable from the center part as such. E.g. the column and the sleeve can be removed from the center part in an upward direction which remains in the injection molding machine resting on the base.

The sleeve and the column may form a transfer unit which can be assembled and disassembled independent of the center part. The transfer unit preferably comprises a first and a second media interface through which liquid and/or gaseous media can be exchanged with the inner mold halves attached to the center part. Therefore, the center part may comprise a third and the base a fourth media interface which are compatible to the first and the second media interface. Alternatively, or in addition pipes for media may be interconnected directly to the lower end of the column, respectively the first media interface. Good results can be achieved when the second media interface is arranged at the upper end of the sleeve, while the first media interface is arranged at the lower end of the column. At least the second and the third media interface may be interconnected indirectly to each other via a link element, e.g. in the form of a ring in a mounted position interconnecting to the upper end of the sleeve with the center part.

In a variation at least one section comprises at least one groove used to exchange liquid and/or gaseous media between the column and the sleeve. The at least one groove can be arranged along on outer surface of the column and or a thereto corresponding inner surface of the sleeve. Normally on both sides adjacent to the at least one groove for the liquid and/or gaseous media a groove is arranged to receive a sealing means. Good results can be achieved when between two adjacent sections a smooth transition surface is arranged which supports assembly and disassembly of the sleeve with respect to the column. If appropriate the sleeve can be integrated in the center part.

In a preferred variation the base comprises a detachable fixture for the column which allows to detach the column from the base even when the center part is arranged on the base. This offers the advantage that the maintenance becomes possible without removing the center part from the holding device. If appropriate the fixture may comprise at least one radial and/or axial supporting surface to support the center part in radial and/or axial direction with respect to the base. The radial and/or axial supporting surface can be foreseen to receive at least one bearing, e.g. in the form of a ball or a needle bearing. Alternatively, or in addition other fixation means can be foreseen by which the center part can be temporarily fixed to the base to provide a stable support while the column is removed from the center part. The center part as well as the base comprise thereto compatible abutments. The fixation means can e.g. be in the form of a threaded support preferably arranged between the center part and the base. The fixation means must be able to securely hold and position the weight of the center part and the thereto attached elements with respect to the base in a manner, such that the column can be removed from the sleeve, respectively the center part and vice-versa.

In a variation the rotating device comprises a drive with a stationary part and a rotary part which is interconnected to the rotating center part by a quick release coupling such that the drive is easily detachable from the center part. Good results can be achieved when the drive sits above the center part, respectively the column, e.g. the stationary part of the drive is interconnected via a yoke to the injection molding machine by at least one upper tie bar. Preferably, the stationary part of the drive is detachably interconnected to the column, e.g. by a quick release coupling a first and a thereto interconnectable second part which transfer torque between the drive and the center part. For additional centering the first and the second part of the quick release coupling can be self-centering with respect to each other. The drive may comprise a gear box which is preferably arranged on the stationary side.

Disassembling of the rotating device, e.g. for maintenance, can be executed as described hereinafter:

(a) Providing injection molding device comprising a center part and a rotating device for holding and rotating the center part in the injection molding device, the rotating device comprising a base supported with respect to an injection molding machine, a column attached to the base extending in an axial direction above the base and a sleeve coaxially surrounding the column and being at least partially arranged in the center part, wherein the sleeve rotates with the center part around the column.

(b) Separating the column from the center part alone or in combination with the sleeve. If appropriate the separation takes place outside of the injection molding machine or inside the injection molding machine, i.e. while the column or the center part remain in the injection molding device.

(c) If appropriate, the center part is temporarily fixed with respect to the base before releasing a fixture holding the column with respect to the base.

(d) Either: removing the column from the center part in an upward direction away from the base.

(e) Or: Removing the column from the center part in a downward direction in that the center part is lifted away from the base in an upward direction.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figures 1, 2:
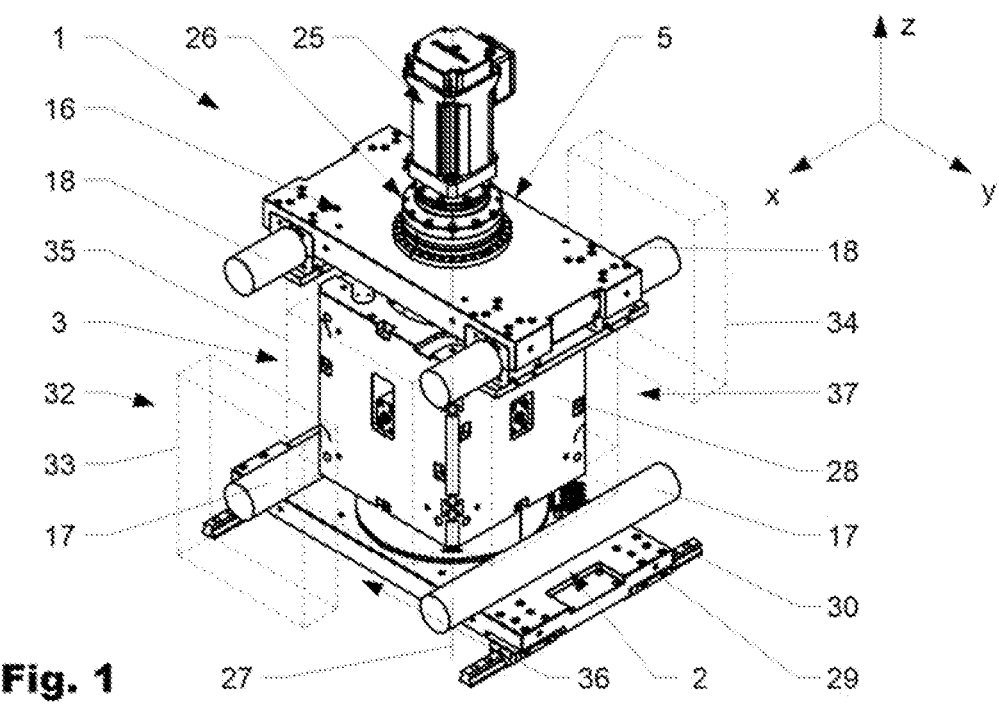
FIG. 1 shows a first variation of an injection molding device in a perspective manner.
FIG. 2 shows the injection molding device according to FIG. 1 in a partially disassembled manner.
Figure 3:
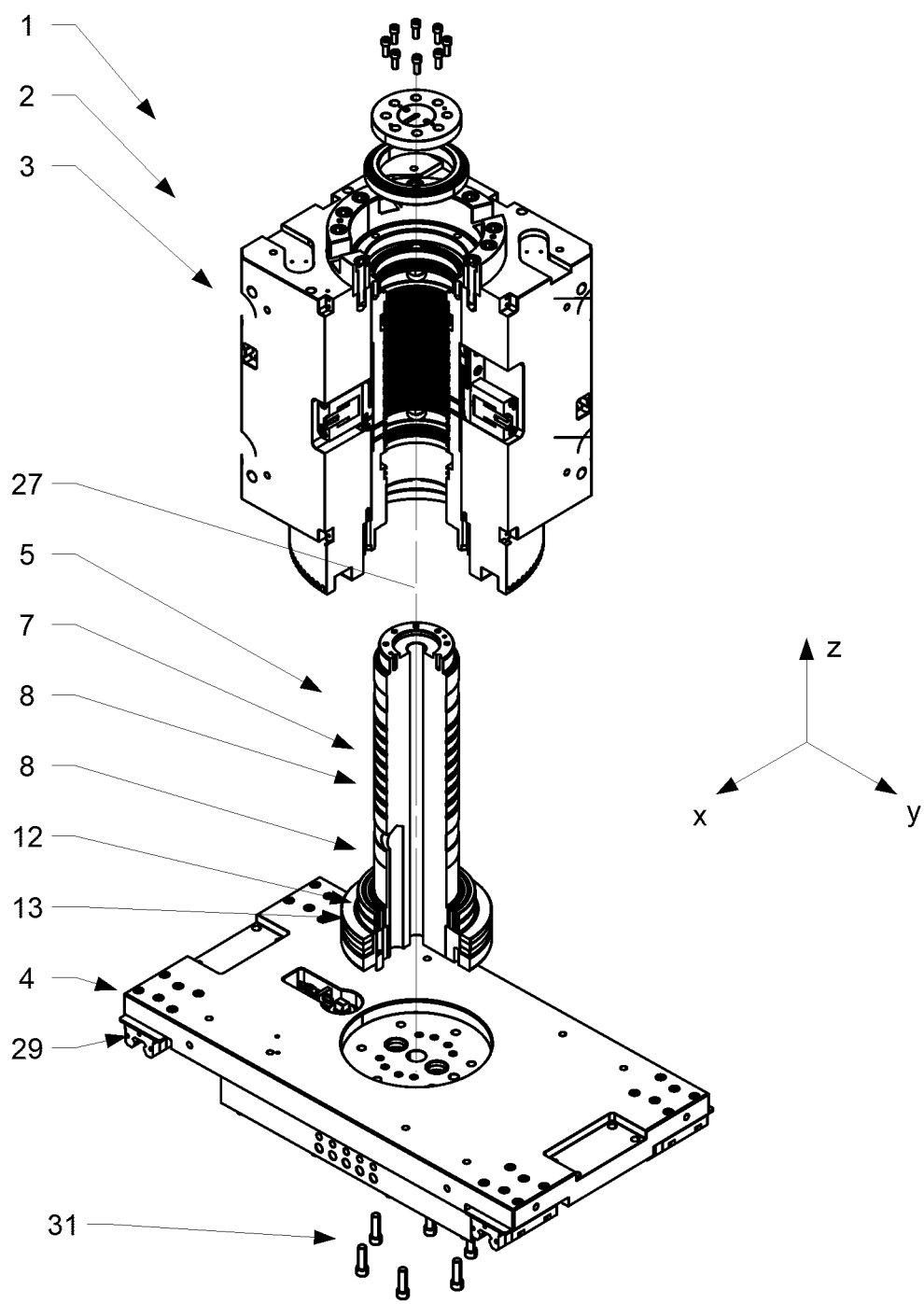
FIG. 3 shows the injection molding device according to FIG. 1 in an exploded view.
Figure 4:
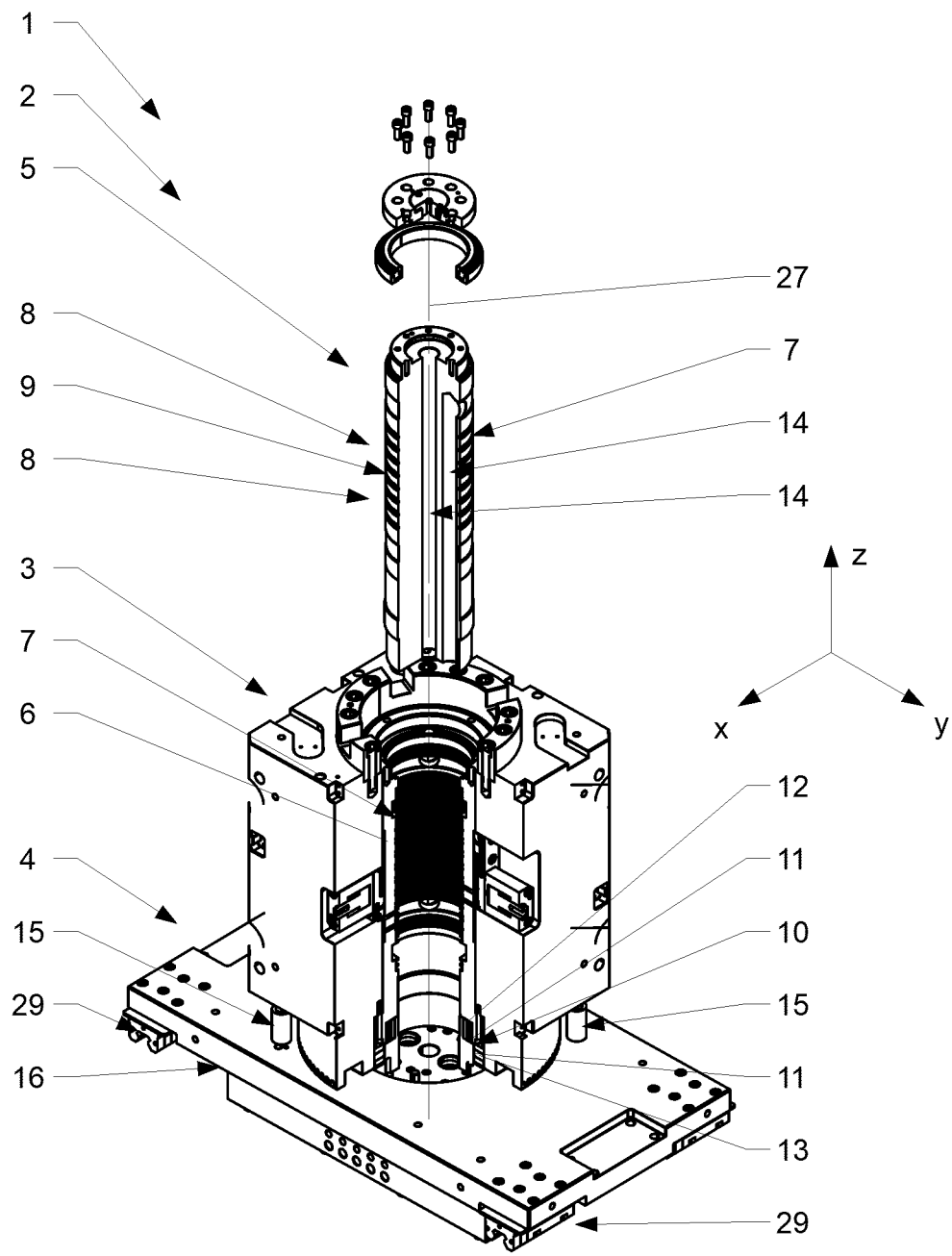
FIG. 4 shows a second variation of the injection molding device in a partially dismantled view.
Figure 5:
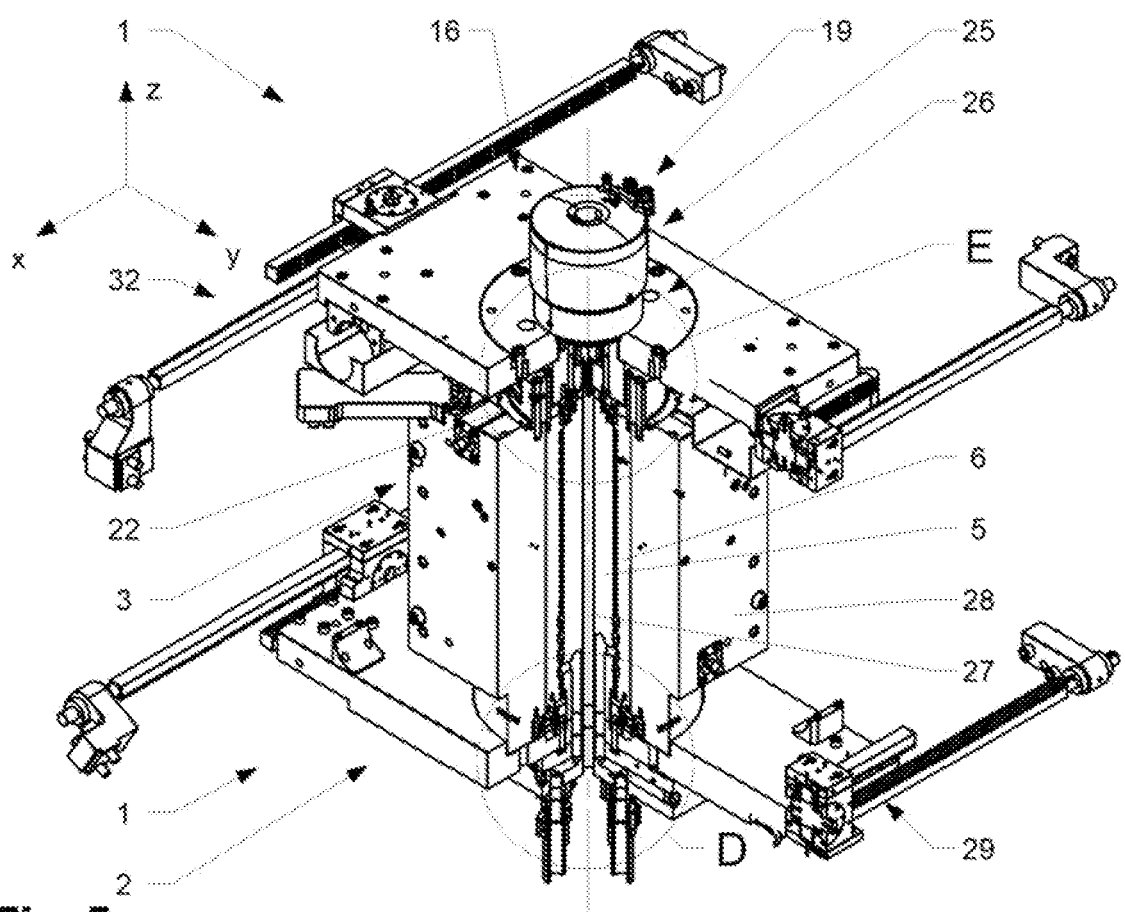
FIG. 5 shows a third variation of an injection molding device in a perspective manner and partially cut.
Figure 6:
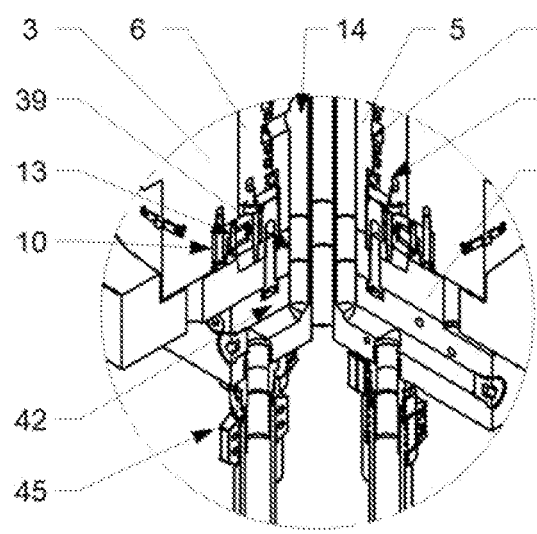
FIG. 6 shows detail D according to FIG. 4 in a magnified manner.
Figure 7:
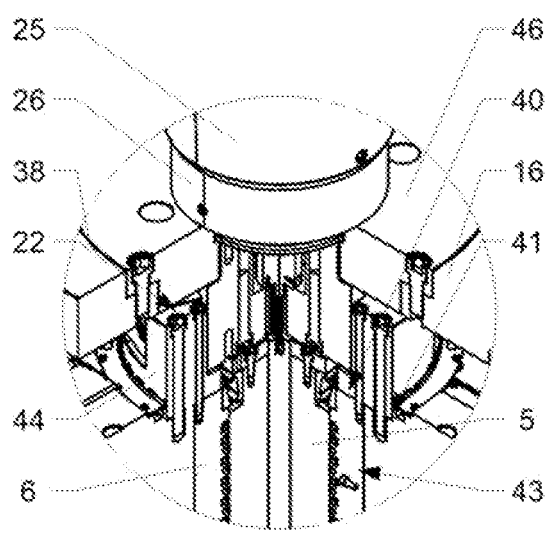
FIG. 7 shows detail E according to FIG. 4 in a magnified manner.
Figure 8:
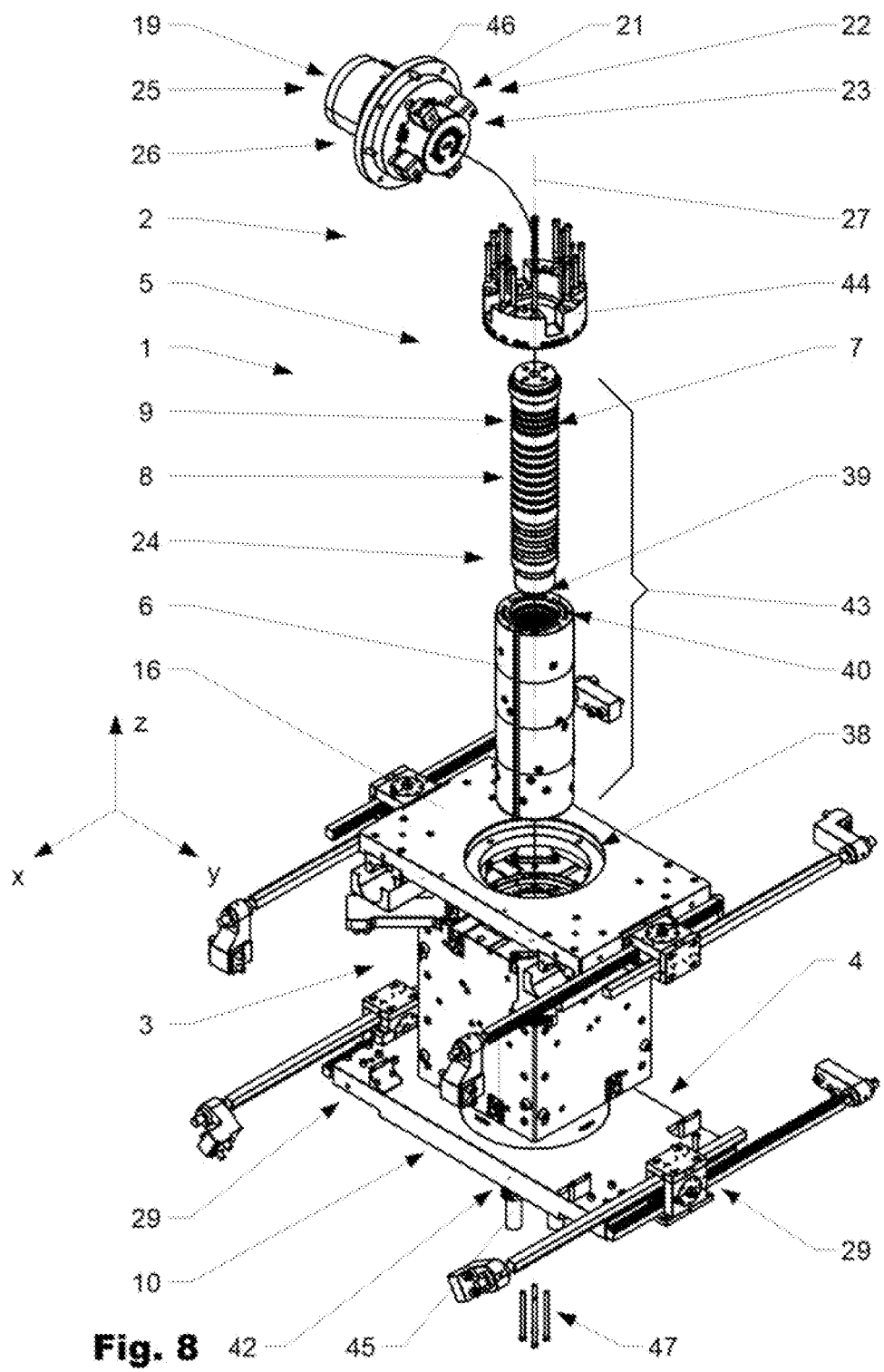
FIG. 8 shows the injection molding device according to FIG. 5 in a partially disassembled manner.

FIG. 1 shows a variation of an injection molding device 1 according to the invention in a perspective manner from above. FIG. 2 shows the injection molding device 1 according to FIG. 1 in a partially dismantled position. FIG. 3 shows the injection molding device 1 in an exploded view. FIG. 4 shows the injection molding device 1 in another partially dismantled position. FIG. 5 shows a further variation of the injection molding device 1 in a perspective, partially cut view, such that the inside becomes apparent. FIG. 6 shows detail D according to FIG. 5 and FIG. 7 shows detail E according to FIG. 5. FIG. 8 shows the variation according to FIG. 5 in a partially dismantled state.

The injection molding device 1 comprises a center part 3 and a rotating device 2 for holding and rotating the center part 3 in the injection molding device 1 when then injection molding device 1 is in an open position.

The injection molding device 1 can be used for highly efficient injection molding of plastic products. As indicated in FIG. 1 it normally comprises an injection mold 32 with a first outer mold half 33 (schematically indicated by dotted lines) and a thereto along upper and lower tie bars 17, 18 of an injection molding machine in a first direction (x-direction) relatively to the first outer mold half displaceable second outer mold half 34 (schematically indicated by dotted lines). Between the first and the second outer mold half a center part 3 is arranged rotatable around a center axis 27 extending in vertical direction (z-direction). The center part 3 comprises in the shown variation four side faces 28 which are arranged in pairs parallel to each other and which each carry an inner mold half 35 (schematically indicated by dotted lines). The inner mold halves 35 in a closed position of the injection molding device 1 interact with the first and the second outer mold halves in a first and in a second separation plane 36, 37 forming cavities suitable to receive melted plastic material injected through a sprue channel into the cavities to form objects consisting at least partially from the melted plastic material. After the melted plastic material has sufficiently cured, the injection molding device 1 is opened in the area of the first and second separation planes 36, 37, if appropriate parts are ejected and the center part 3 is rotated by an appropriate angle, here at 90°, around the center axis 27 such that another two inner mold halves 35 can be interconnected to the first and second outer mold halves 33, 34 forming cavities as described above.

As visible in the drawings the rotating device 2 comprises a base 4 which in the shown variation is in x-direction linearly displaceable supported on a machine bed (not shown in the drawings) via linear bearings 29 and rails 30 attached to the machine bed. As visible in FIGS. 3 and 4, a column 5 is attached to the base and extends in axial direction above the base 4. A sleeve 6 is arranged on and coaxially surrounds the column 5. The sleeve 6 is arranged in and herein fixedly interconnected to the center part 3. Good results can be achieved when the center part is made from a material which has a lower density then the material of the sleeve. Good results can be achieved when the sleeve 6 is made from steel or the like and the center part 3 is made from aluminum or the like. The sleeve 6 is attached to and rotates with the center part 3 around the column 5 which is attached to the base 4. Grooves arranged between the sleeve and the column are used to exchange liquid and/or gaseous media between the column and the sleeve, respectively the center part.

As best visible in FIG. 2, FIG. 5 and FIG. 8 the rotating device 2 comprises a drive 19 with a non-rotary part 20 and a rotary part 21 which is interconnected to the rotating center part 3 by a quick release coupling 22 such that the drive 19 is easily detachable from the center part 3 as schematically indicated in FIG. 2 and FIG. 8. Good results can be achieved when the drive 19 sits above the center part 3, respectively the column 5 in a coaxial manner. The stationary part 20 of the drive 19 is interconnected via a yoke 16 to the injection molding machine by at least one upper tie bar 18. The stationary part 20 of the drive 19 can be interconnected detachably to the column 5. The quick release coupling 22 comprises a first and a thereto interconnectable second part 23, 24 which transfer torque between the drive 19 and the rotatable center part 3. For additional centering the first and the second part of the quick release coupling can be self-centering with respect to each other. The drive may comprise a gear box which is preferably arranged on the stationary side.

In the variation according to FIGS. 5 through 8, the drive 19 is mounted on an adapter plate 46 which is attached to an opening 38 of the yoke 16. As visible in FIG. 8, this offers the advantage that drive 19 can be removed together with the adapter plate 46 without dismantling the yoke 16. The opening 38 preferably has a diameter such that the column 5 and the sleeve 6 can then be removed in an upward direction (z-axis) from the center part 3. In the shown variation, the column 5 and the sleeve 6 form a transfer unit 43 which can be removed from the center part 3 after releasing fastening screws 47 accessible from below at the base 4. At a later stage, they can be separated from each other e.g. for maintenance reasons outside the center part 3. The transfer unit 43 can be assembled and disassembled independent of the center part 3. The transfer unit preferably comprises a first and a second media interface 39, 40 through which liquid and/or gaseous media can be exchanged between the outside and the inner mold halves attached to the center part. Therefore, the center part 3 may comprise a third and the base a fourth media interface 41, 42 which are interconnectable to the first and the second media interface 39, 40. Good results can be achieved when the second media interface 40 is arranged at the upper end of the sleeve 6, while the first media interface 39 is arranged at the lower end of the column. Alternatively, or in addition pipes 45 for media transfer may be interconnected directly to the lower end of the column, respectively the first media interface 39 in the region of the lower end of the column 5. At least the second and the third media 40, 41 interface may be interconnected indirectly to each other via a link element 44, e.g. in the form of a ring which in a mounted position interconnects to the upper end of the sleeve 6 with the center part 3 and transfers media there between.

In the variations according to FIGS. 3 and 4 the column 5 is arranged removable with respect to the center part 3, respectively the sleeve 6. In the variation according to FIG. 3 the column 5 is detachable from the center part 3 in a downward direction while in the variation according to FIG. 4 the column 5 is detachable in an upward direction as will be explained in more detail hereinafter. In both variations, the column 5 is arranged detachable from the base 4 by removing fastening means 31 first.

The columns 5 of both variations are having in axial direction a variable diameter. Depending on the design the variable diameter can be e.g. linearly varying. Alternatively, or in addition as shown here the column 5 can have a staggered design, with at least two sections 8 arranged coaxially in and adjacent to each other and with respect to the axial direction of the column 5.

In the variation as shown in FIG. 4 the sections 8 have decreasing diameters in the direction towards the base 4 of the rotation device 2 such that the column 5 can be removed from the center part 3, respectively the sleeve 6 in an upward direction as shown away from the base 4. The column 5 is therefore interconnected detachably to the base 4.

In the variation according to FIG. 3 the decreasing diameter is arranged in the opposite direction, i.e. smaller diameters are further away from the base 4. Thereby it would be possible to leave the column attached to the base and remove the center part 3 in an upward direction away from the base 4. Alternatively, or in addition a separation of the center part 3 from base 4 can be achieved by designing the sleeve 6 removable from the center part 3 as such.

In the shown variation at least one section 8 comprises at least one groove 7 interconnected to one or several channels 14 arranged in the column 5 and/or the sleeve 6. The grooves 7 are used to exchange liquid and/or gaseous media between the column 5 and the sleeve 6. The at least one groove 7 can be arranged along on outer surface of the column 5 and/or a thereto corresponding inner surface of the sleeve 6. Normally on both sides adjacent to the at least one groove for the liquid and/or gaseous media a groove is arranged to receive a sealing means. Good results can be achieved when between two adjacent sections a smooth transition surface 9 is arranged which supports assembly and disassembly of the sleeve with respect to the column.

As visible in FIG. 4 the base 4 comprises a detachable fixture 10 for the column 5 which allows to detach the column 5 from the base 4 even while the center part 4 remains on the base 4. This offers significant advantage in that maintenance becomes possible without removing the heavy and bulky center part 3 from the rotating device 2, i.e. the center part 3 can remain in the injection molding device 1 which service is made to the rotating device.

In the variation according to FIG. 4 the fixture 10 for the column 5 comprise at least one radial and/or axial supporting surface 11 to support the center part 3 directly and/or via the sleeve 6 in radial and/or axial direction with respect to the base 4. The radial and/or axial supporting surface receive at least one bearing 12, 13. If appropriate additional fixation means 15 can be foreseen by which the center part 3 can be fixed temporarily to the base 4 to provide a sufficiently stable support while the column 5 is removed from the center part 3. The center part as well as the base comprise thereto corresponding abutments. The fixation means 15 can be in the form of a threaded support preferably arranged between the center part 3 and the base 4. The fixation means 15 must be able to securely hold and position the weight of the center part 3 and the thereto attached elements with respect to the base in a manner, such that the column 5 can be removed from the sleeve 6, respectively the center part and vice-versa.

Rather, the words used in the specification are words of description rather than limitation, and it is understood that various changes may be made without departing from the Spirit and scope of the invention.

The invention claimed is:

1. An injection molding device (1) comprising a center part (3) and a rotating device (2) for holding and rotating the center part (3) in the injection molding device (1), the rotating device (2) comprising:
   a. a base (4) supported with respect to an injection molding machine,
   b. a column (5) attached to the base (4) extending in an axial direction (z) above the base (4) and
   c. a sleeve (6) coaxially surrounding the column (5) and at least partially arranged in the center part (3), wherein the sleeve (6) rotates with the center part (3) around the column (5), wherein
   d. grooves (7), used to exchange liquid and/or gaseous media between the column (5) and the sleeve (6), are arranged between the column (5) and the sleeve (6) and wherein
   e. the column (5) is arranged removable with respect to the center part (3);
   f. a support, wherein the center part (3) is fixed with respect to the base (4) by the support when the column (5) is removed from the center part (3).

2. The injection molding device (1) according to claim 1, wherein the column is interconnected detachable to the base (4).

3. The injection molding device (1) according to claim 2, wherein the column (5) in its axial direction (z) has a variable diameter.

4. The injection molding device (1) according to claim 3, wherein the diameter of the column (5) decreases in the direction of the base (4) such that the column can be removed from the sleeve (6) in the center part (3) in the direction away from the base (4).

5. The injection molding device (1) according to claim 4, wherein the column (5) has a staggered design with at least two sections (8) arranged coaxially and adjacent to each other in axial direction, wherein the sections (8) having decreasing diameters in the direction of the base (4).

6. The injection molding device (1) according to claim 5, wherein one section (8) comprises at least one groove (7) used to exchange liquid and/or gaseous media between the column (5) and the sleeve (6).

7. The injection molding device (1) according to claim 5, wherein a smooth transition surface (9) is arranged between two adjacent sections (8).

8. The injection molding device (1) according to claim 1, wherein the base (4) comprises a fixture (10) for the column (5).

9. The injection molding device (1) according to claim 8, wherein the fixture (10) comprises at least one radial and/or axial supporting surface (11) to support the center part (3) in radial and/or axial direction with respect to the base (4).

10. The injection molding device (1) according to claim 1, wherein the rotating device (2) comprises a drive (19) with a stationary part (20) and a rotary part (21) which is interconnected to the rotating center part (3) by a quick release coupling (22) such that the drive (19) is detachable from the center part (3) across the quick release coupling (22).

11. The injection molding device (1) according to claim 10, wherein the stationary part (20) of the drive (19) is interconnected via a yoke (16) to the injection molding machine by at least one upper tie bar (18).

12. The injection molding device (1) according to claim 10, wherein the stationary part (20) of the drive (19) is mechanically interconnected to the column (5).

13. The injection molding device (1) according to claim 10, wherein a first part (23) and a second part (24) of the quick release coupling (22) are self-centering with respect to each other.

14. The injection molding device (1) according to claim 1, wherein the column (5) and the sleeve (6) form part of a transfer unit (43).

15. A rotating device (2) suitable to be used in an injection molding device (1) according to claim 1.

16. A center part (3) suitable to be used in an injection molding device (1) according to claim 1.

17. An injection mold (32) comprising a first and a second outer mold half (33, 34) and inner mold halves (35) interconnectable to center part (3) suitable to be used in an injection molding device (1) according to claim 1.

18. A transfer unit (43) for an injection molding device (1), the transfer unit (43) comprising:
   a. a column (5) comprising in an area of its lower end in an operational orientation a first media interface (39); and
   b. a sleeve (6) comprising in an area of its upper end in an operational orientation a second media interface (40) suitable to exchange liquid and/or gaseous media with a center part (3) of the injection molding device (1), wherein the sleeve and the column form the transfer unit which is configured for assembly and disassembly independent of the center part.

19. A method for the disassembly of an injection molding device (1) comprising the following method steps:
   a. providing an injection molding device (1) comprising a center part (3) and a rotating device (2) for holding and rotating the center part (3) in the injection molding device (1), the rotating device (2) comprising a base (4) supported with respect to an injection molding machine, a column (5) attached to the base (4) extending in an axial direction (z) above the base (4) and a sleeve (6) coaxially surrounding the column (5) and being at least partially arranged in the center part (3), wherein the sleeve (6) rotates with the center part (3) around the column (5);
   b. separating the column (5) from the center part (3) while the column (5) or the center part (3) remain in the injection molding device (1).

20. A method according to claim 19, in addition comprising:
   a. fixing the center part (3) with respect to the base (4);
   b. releasing a fixture (10) holding the column (5) with respect to the base (4); and
   c. removing the column (5) from the center part (3) in an upward direction (z) away from the base (4).

21. A method according to claim 19, in addition comprising removing the column (5) from the center part (3) in a downward direction in that the center part (3) is lifted away from the base (4) in an upward direction (z).

* * * * *